United States Patent

[11] 3,584,521

| [72] | Inventors | Robert S. Tooker;<br>James J. Dawson, both of East Lansing, Mich. |
|---|---|---|
| [21] | Appl. No. | 41,888 |
| [22] | Filed | June 1, 1970 |
| [45] | Patented | June 15, 1971 |
| [73] | Assignee | General Motors Corporation<br>Detroit, Mich.<br>Continuation-in-part of application Ser. No. 812,011, Apr. 1, 1969, now abandoned. |

[54] IGNITION TIMING CONTROL
5 Claims, 5 Drawing Figs.

[52] U.S. Cl. .................................................. 74/856, 123/117
[51] Int. Cl. ........................................................ F02d 13/00, F02p 5/04
[50] Field of Search ........................................ 123/117; 74/851—853, 856

[56] References Cited
UNITED STATES PATENTS

| 2,373,259 | 4/1945 | Price ............................ | 74/851 |
| 2,440,055 | 4/1948 | Matulaitis ..................... | 74/853 |
| 2,455,594 | 12/1948 | Mallory ......................... | 123/117 |
| 2,508,851 | 5/1950 | Young et al. ................. | 123/117 |
| 3,476,094 | 11/1969 | Rucins et al. ................. | 123/117 X |
| 3,486,595 | 12/1969 | Turner .......................... | 123/117 X |

*Primary Examiner*—Arthur T. McKeon
*Attorneys*—J. L. Carpenter and C. K. Veenstra ABSTRACT: A valve in the vacuum conduit between the induction passage and the distributor vacuum advance unit closes when the transmission is in the lower drive ratios to prevent vacuum advance during low drive ratio operation and opens when the transmission is in high drive ratio to permit vacuum advance during high drive ratio operation. This control has been found advantageous in reducing automotive exhaust emissions of unburned hydrocarbons and oxides of nitrogen.

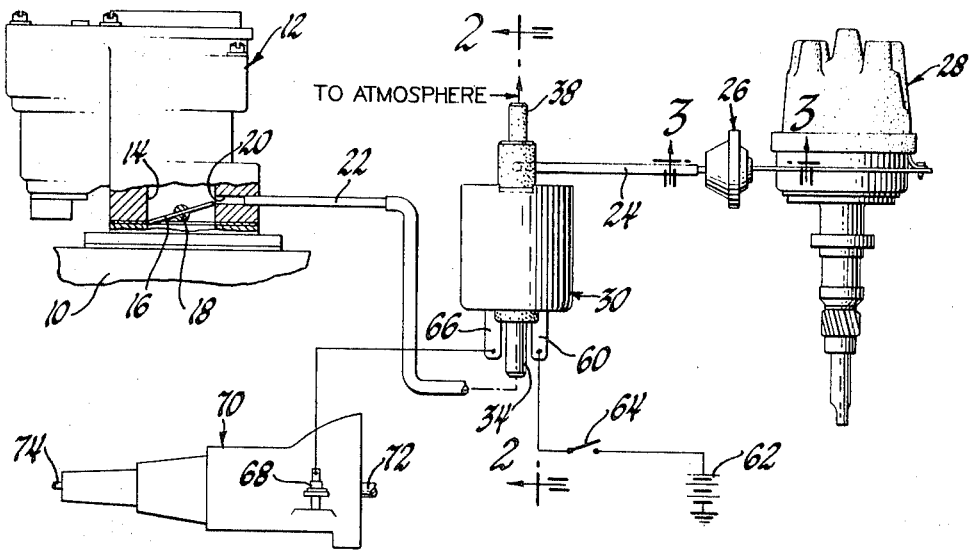
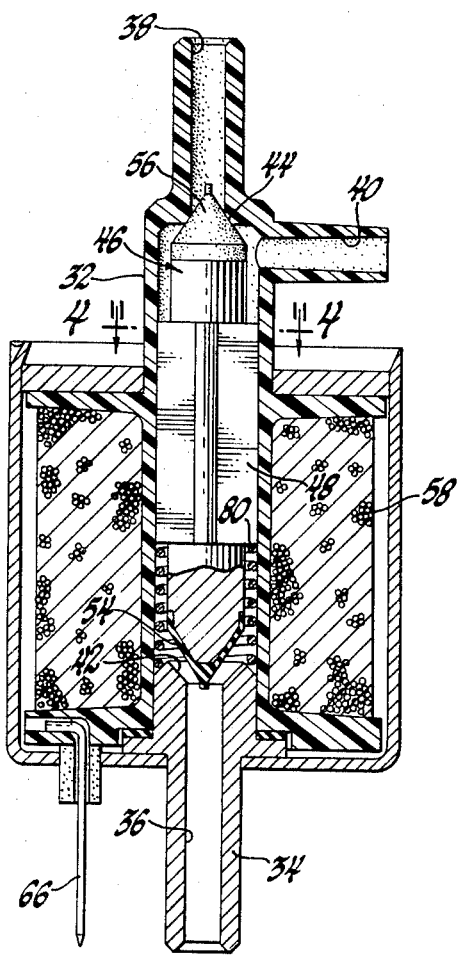
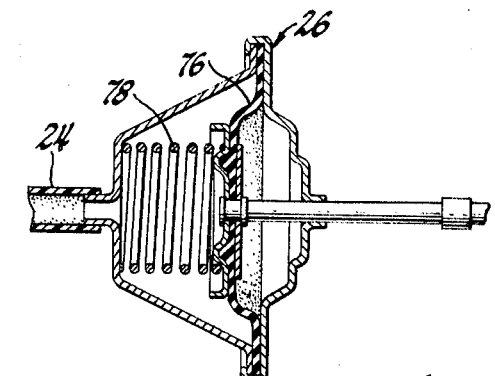
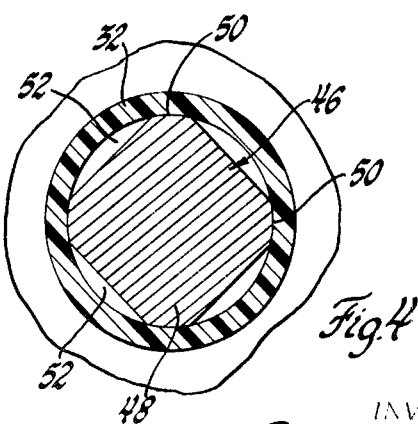

IGNITION TIMING CONTROL

This application is a continuation-in-part of our pending application Ser. No. 812,011, now abandoned filed Apr. 1, 1969.

SUMMARY OF THE INVENTION

This invention relates to control of internal combustion engine ignition timing which results in reduced emission of undesirable engine exhaust gas constituents.

In the past it has been customary to provide a vacuum unit in association with the ignition distributor of the engine. The vacuum unit senses the vacuum in the engine induction passage below the throttle and, operating on the distributor breaker plate, advances the ignition timing accordingly. By advancing ignition timing in accordance with induction vacuum, fuel economy and engine performance have been maximized.

We have discovered that emission of undesirable engine exhaust gas constituents, such as unburned hydrocarbons and oxides of nitrogen, can be substantially reduced by preventing vacuum advance of ignition timing when the engine is driving the vehicle or other load in the lower drive ratios (and when idling and decelerating) and that fuel economy and engine performance can be maintained without significant sacrifice by providing vacuum advance of ignition timing only when the engine is driving in the high drive ratio.

This invention provides an ignition timing control by which this discovery was made. In the preferred embodiment set forth herein, this ignition timing control includes a solenoid valve disposed in the vacuum conduit between the induction passage and the distributor vacuum advance unit. The solenoid is energized through a switch when the transmission is in a low drive ratio mode of operation, and the valve then closes the vacuum conduit to prevent vacuum advance of the ignition timing. When the transmission is in a high drive ratio mode of operation, the solenoid is deenergized and the valve then opens the vacuum conduit to permit vacuum advance of the ignition timing.

Because of its operation, this control has come to be known as the transmission-controlled spark system, or more simply, TCS.

The details as well as other objects and advantages of this invention are set forth in the drawings and description of a preferred embodiment.

SUMMARY OF THE DRAWINGS

FIG. 1 shows, somewhat schematically, this ignition timing control with the solenoid valve disposed in the vacuum conduit between the induction passage and the distributor vacuum advance unit and connected through a switch which senses the transmission drive ratio;

FIG. 2 is an enlarged sectional view of the solenoid valve, taken along line 2-2 of FIG. 1, showing the details of its construction;

FIG. 3 is an enlarged sectional view of the vacuum advance unit, taken along line 3-3 of FIG. 1, showing the details of its construction;

FIG. 4 is a view along line 4-4 of FIG. 2, further enlarged to show the details of the valve and its disposition in the housing.

DESCRIPTION OF THE PREFERRED EMBODIMENT

Figure 5:
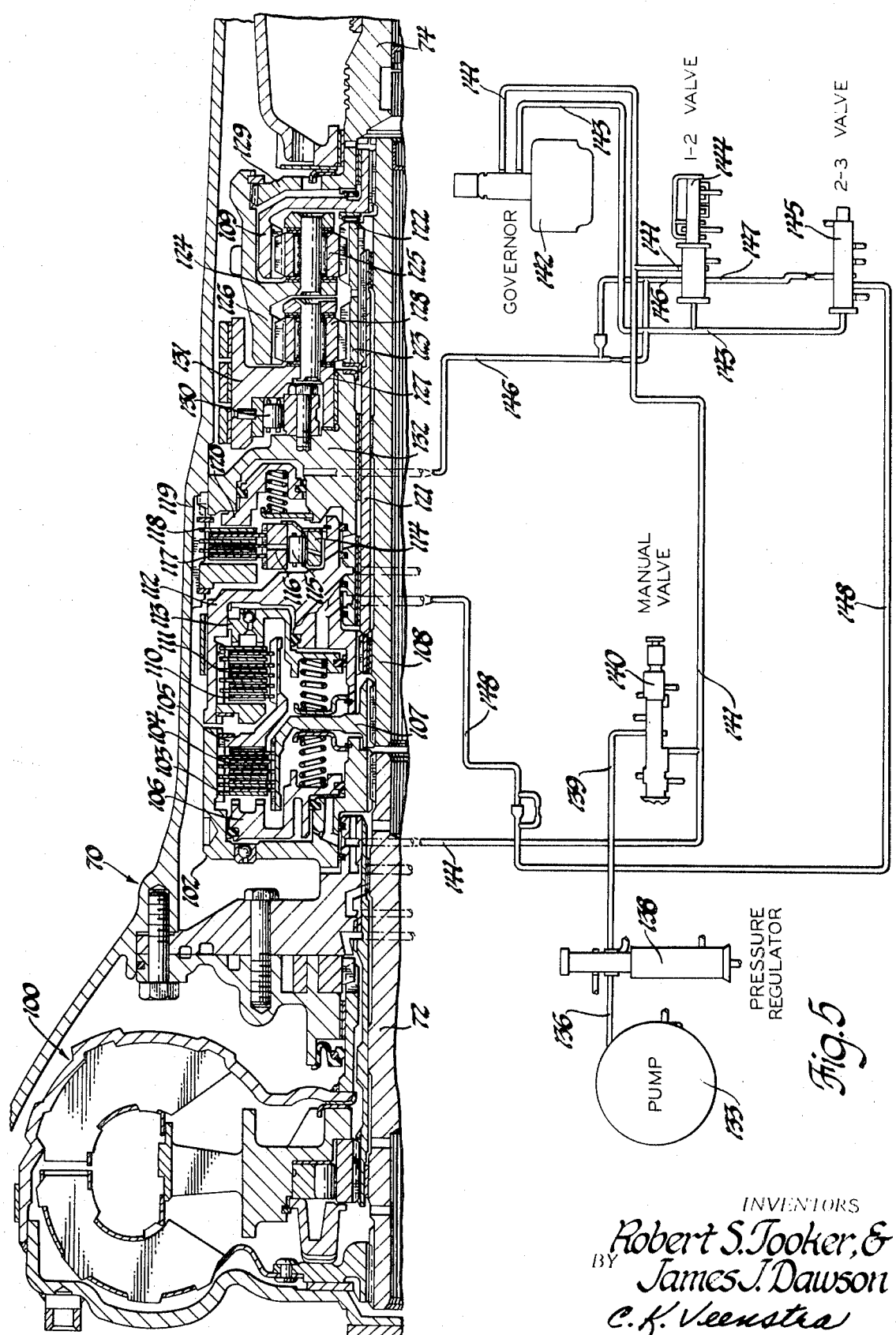
FIG. 5 is a sectional view, in side elevation, of the transmission of FIG. 1, illustrating its construction and showing schematically certain portions of its hydraulic circuitry.

Referring to FIG. 1, the engine 10 is illustrated as having a carburetor 12 providing the induction passage 14. A throttle 16 is rotatably disposed on a shaft 18 in induction passage 14. A port 20 opens from induction passage 14 at a location adjacent the edge of throttle 16. Port 20 is on the upstream side of throttle 16 when throttle 16 is in the closed position as illustrated; when throttle 16 is moved to an open position, its edge traverses port 20 and port 20 then senses the vacuum in induction passage 14 downstream of throttle 16.

Port 20 is connected through a conduit 22—24 to a vacuum advance unit 26 mounted on distributor 28. A solenoid valve unit 30 is disposed in conduit 22—24. Referring to FIG. 2, valve unit 30 includes an elongated hollow two-piece housing 32—34 having first and second openings 36 and 38 disposed in opposite ends thereof and a lateral opening 40 disposed intermediate the ends. A pair of valve seats 42 and 44 are defined by openings 36 and 38 respectively.

A magnetically responsive valve element 46 is disposed within housing 32—34 and is reciprocable between valve seats 42 and 44. As shown in FIG. 4, the central portion 48 of valve element 46 is essentially square, having rounded apexes 50 which contact the interior of housing 32. The spaces 52 defined between central portion 48 of valve element 46 and housing 32 form passages through which vacuum signals may be supplied form opening 36 to opening 40. Valve element 46 has resiliently tipped ends 54 and 56 which respectively cooperate with valve seats 42 and 44 to close either opening 36 or opening 38.

A solenoid coil 58 is disposed about housing 32. As shown in FIG. 1, one lead 60 of coil 58 is connected to a voltage source 62 through the engine ignition switch 64. The other lead 66 for coil 58 is connected to a switch 68 which opens the circuit when it senses the pressure of the hydraulic fluid used to engage the direct drive clutch in transmission 70 and which closes the circuit to ground in the absence of such pressure. As explained in further detail below, transmission 70 includes a plurality of drive ratios which are selectively engageable between driven shaft 72 and drive shaft 74. When a lower drive ratio is engaged between driven shaft 72 and drive shaft 74, the speed of the drive shaft 74 is reduced below the speed of driven shaft 72 to a greater extent than when the high drive ratio is engaged between driven shaft 72 and drive shaft 74.

Referring to FIG. 3, vacuum advance unit 26 includes a diaphragm 76 biased in a direction to retard ignition timing by a spring 78. When vacuum signals are supplied through vacuum conduit 22—24 to vacuum advance unit 26, the vacuum signals are applied against the left-hand side of diaphragm 76 and pull it in a direction, against the bias of spring 78, to advance ignition timing.

OPERATION

With the solenoid deenergized as shown in FIG. 2, when throttle 16 is opened, port 20 will be subjected to the induction vacuum therebelow. This vacuum signal will be transmitted through vacuum conduit 22, opening 36, valve seat 42, passages 52 along the central portion of valve element 48, lateral opening 40, and vacuum conduit 24 to vacuum advance unit 26 to cause the ignition timing to be advanced. When the throttle is closed, as at idle and during deceleration, the port 20 is subjected to the essentially atmospheric pressure above throttle 16 so that no vacuum advance signals are provided to vacuum unit 26.

When transmission 70 is in one of the lower drive ratio modes of operation, switch 68 will cause the solenoid coil 58 to be energized; magnetically responsive valve 46 will then be pulled downwardly against the bias of a spring 80 so that tip 54 of valve element 46 engages valve seat 42 and tip 56 of valve element 46 moves away from valve seat 44. Engagement of valve tip 54 with valve seat 42 prevents transmission of vacuum signals from induction passage 14 to vacuum advance unit 26. Instead, vacuum advance unit 26 is vented to atmosphere through vacuum conduit 24, lateral opening 40, open valve seat 44 and opening 38.

FIG. 5 illustrates certain details of transmission 70. Since transmission 70 is of well-known construction, as shown, for example, by the 1969 Oldsmobile Chassis Service Manual, and since it has been explained at length in U.S. Pat. No. 3,321,056, only certain portions are set forth and discussed here.

Transmission 70 has an input shaft 72 driven by the engine through a torque converter 100. A clutch housing 102 is splined to shaft 72 for rotation therewith. A series of clutch discs 103 and 104 are adapted to be engaged when forced against a backing member 105 by a piston 106. Clutch discs 103 are splined for axial movement on clutch housing 102, and clutch discs 104 are splined for axial movement on a clutch hub 107. Clutch hub 107 is splined to an intermediate shaft 108 for driving shaft 108 when discs 103 and 104 are engaged. A ring gear 109 is splined to shaft 108 for rotation therewith. A series of clutch discs 110 are splined for axial movement on an extension of clutch backing member 105. Clutch discs 110 are adapted to engage with a series of clutch discs 111, splined for axial movement on a clutch drum 112, when forced by a piston 113. Clutch drum 112 carries a race 114 adapted to be gripped by a one-way brake 115. A second race 116 is held against rotation upon engagement of a series of brake discs 117 with a series of brake discs 118. Brake discs 117 are splined for axial movement on race 116, and brake discs 118 are splined for axial movement on the transmission housing 119. Brake discs 117 and 118 may be engaged by a piston 120. Clutch drum 112 is splined to a sleeve shaft 121 which in turn is splined to a pair of sun gears 122 and 123. A planet carrier 124 supports a planet gear 125 in mesh with sun gear 122 and ring gear 109 and also supports a ring gear 126. A second planet carrier 127 supports a planet gear 128 in mesh with sun gear 123 and ring gear 126. Planet gear 124 and ring gear 126 rotate as a unit, with output shaft 74 connected to planet carrier 124 by a flange 129. A one-way brake 130 is disposed between a brake drum 131 and a fixed support 132.

In operation, low gear is obtained by engaging clutch discs 103 and 104. Power from input shaft 72 is delivered to ring gear 109 through clutch discs 103 and 104 and shaft 108 to drive ring gear 109 forwardly. Due to the load of output shaft 74 on planet carrier 124, planet carrier 124 tends to remain stationary so that sun gears 122 and 123 are driven reversely. Power input to planet gear 128 from sun gear 123 tends to cause planet carrier 127 to spin but such rotation of planet carrier 127 is prevented by one-way brake 130. Planet gear 128 therefore drives ring gear 126 forwardly. In low gear, drive is at the compound reduction of both planetary gearing units.

Second gear is obtained by retaining clutch discs 103 and 104 in engagement and engaging brake discs 117 and 118. Through action of brake discs 117 and 118, one-way brake 115 is rendered effective to prevent reverse rotation of clutch drum 112 and sun gears 122 and 123. Power is applied to ring gear 109, sun gears 122 and 123 are held against rotation, and planet carrier 124 is driven forwardly at the reduction ratio of the gear unit 109, 125, 122. One-way brake 130 on planet carrier 127 releases to permit planet carrier 127 to spin freely.

Direct drive or high gear is obtained by retaining clutch discs 103 and 104 in engagement, retaining brake discs 117 and 118 in engagement, and engaging clutch discs 110 and 111. One-way brake 115 permits forward rotation of clutch drum 112 and drive of sun gears 122 and 123. Since both ring gear 109 and sun gear 122 are driven at the same speed, the gear unit 109, 125, 122 is locked up and drives planet carrier 124 in direct drive. Since planet carrier 124 and sun gear 123 are driven at the same speed, the gear unit 123, 128, 126 is locked up and drive of output shaft 74 is direct drive without gear reduction.

Fluid pressure for the control system is supplied by an engine driven pump 133. Oil is discharged under pressure from pump 133 through a passage 136 to a pressure regulator 138. A main line supply passage 139 extends from pressure regulator 138 to a manually operable drive range selector valve 140. With manual valve 140 in "drive" position, pressure is conducted from main line supply passage 139 to a drive passage 141. Drive passage 141 conducts pressure to clutch piston 106 which engages clutch discs 103 and 104; this places transmission 70 in low gear operation.

A governor 142, driven by transmission output shaft 74, receives pressure from drive passage 141 and delivers variable pressure to a governor pressure delivery passage 143. The pressure in governor passage 143, which increases as vehicle speed increases, is conducted to a low gear to second gear (1–2) shift valve 144 and to a second gear to high gear (2–3) shift valve 145. At a predetermined vehicle speed, governor pressure causes 1–2 shift valve 144 to move to its upshift position and transmit pressure from drive passage 141 through a passage 146 to brake piston 120 which engages brake discs 117 and 118; this places transmission 70 in second gear operation. Upon a further increase in vehicle speed, governor pressure causes 2–3 shift valve 145 to move to its upshift position and transmit pressure, received through a passage 147 from 1–2 shift valve 144, through a passage 148 to clutch piston 113 which engages clutch discs 110 and 111; this places transmission 70 in direct drive or high gear operation.

As indicated above, switch 68 is responsive to pressure in passage 148. It will be appreciated, however, that switch 68 also could be responsive to a predetermined pressure in governor pressure delivery passage 143, or as another alternative, switch 68 could be mechanically operated by 2–3 switch valve 145.

It also will be appreciated that in a transmission where the drive ratio is changed manually rather than through the use of hydraulic pressure, switch 68 may be arranged to be operated by the transmission shift linkage rather than by hydraulic pressure.

Further, it will be appreciated that solenoid valve unit 30 may be replaced by other valve mechanisms which are similarly operated in accordance with transmission drive ratio.

It also should be recognized that other controls over vacuum advance of ignition timing may be used with the above-described control. One such control which may be particularly advantageous is that set forth in U.S. Pat. Nos. 3,301,242 and 3,503,377.

We claim:
1. The method of operating an ignition timing control mechanism on an internal combustion engine having an associated transmission with an input connected to said engine and an output connected to a load and variable ratio drive means for driving said output from said input, said variable ratio drive means providing high and low drive ratios wherein said low drive ratio reduces the speed of said output from said input to a greater extent than said high drive ratio, said method comprising the steps of limiting advance of ignition timing when said low drive ratio is operative, and permitting unlimited advance of ignition timing when said high drive ratio is operative.

2. The method of operating an ignition timing control mechanism on an internal combustion engine having an induction passage for airflow to the engine and further having an associated transmission with an input connected to said engine and an output connected to a load and variable ratio drive means for driving said output from said input, said variable ratio drive means providing high and low drive ratios wherein said low drive ratio reduces the speed of said output from said input to a greater extent than said high drive ratio, said method comprising the steps of permitting advance of ignition timing in accordance with pressure conditions in said induction passage when said high drive ratio is operative, and preventing advance of ignition timing in accordance with pressure conditions in said induction passage when said low drive ratio is operative.

3. An ignition timing control mechanism for an internal combustion engine having an induction passage through which air flows for combustion in the engine, said engine further having an associated transmission with an input connected to said engine and an output connected to a load and variable ratio drive means driving said output from said input, said variable ratio drive means providing high and low drive ratios wherein said low drive ratio reduces the speed of the output from the speed of the input to a greater extent than said high drive ratio, said ignition timing control mechanism comprising a vacuum unit for advancing the timing of ignition in the engine when vacuum signals are supplied to said unit, a vacuum conduit connected between said vacuum unit and said induction passage for transmitting vacuum signals from said induction passage to said vacuum unit, valve means in said conduit movable between a closed position wherein transmission of vacuum signals is prevented and an open position wherein transmission of vacuum signals is permitted, and valve-operating means moving said valve means to closed position to thereby prevent advance of ignition timing by said vacuum unit when said low drive ratio is operative and moving said valve means to open position to thereby permit advance of ignition timing by said vacuum unit when said high drive ratio is operative.

4. The ignition timing control mechanism of claim 3 wherein said valve means includes a hollow elongated housing having first and second openings respectively located in opposite ends thereof and having a lateral opening located intermediate the ends thereof and having a lateral opening located intermediate the ends thereof, said first opening forming part of said vacuum conduit for receiving vacuum signals from said induction passage, said lateral opening forming part of said vacuum conduit for supplying vacuum signals to said vacuum unit, and said second opening being connected to atmosphere for venting said vacuum unit thereto, said first and second openings defining valve seats, wherein said valve means further includes a magnetically responsive valve element disposed within said housing and reciprocable between said valve seats, and wherein said valve-operating means includes a solenoid coil surrounding said housing and switch means energizing said solenoid when said low drive ratio is operative, energization of said solenoid causing said magnetically responsive valve element to move to said closed position against the valve seat defined by said first opening to thereby prevent advance of ignition timing by said vacuum unit, said switch means deenergizing said solenoid when said high drive ratio is operative, and wherein said valve-operating means further includes a spring which upon deenergization of said solenoid moves said valve element to said open position against the valve seat defined by said second opening to thereby permit advance of ignition timing by said vacuum unit.

5. The ignition timing arrangement of claim 3 wherein said engine also has a throttle in said passage rotatable between closed and open positions and wherein said conduit is connected to said passage at a location upstream of said throttle when said throttle is in closed position and downstream of said throttle when said throttle is in open position whereby vacuum signals are supplied to said vacuum unit only when said throttle is open and said high drive ratio is operative.